(12) United States Patent
Whyte et al.

(10) Patent No.: US 11,716,596 B2
(45) Date of Patent: Aug. 1, 2023

(54) METHODS AND SYSTEMS FOR COMMUNICATION VEHICLE-TO-EVERYTHING (V2X) INFORMATION

(71) Applicant: QUALCOMM Incorporated, San Diego, CA (US)

(72) Inventors: William Whyte, Natick, MA (US); Sean Vincent Maschue, Encinitas, CA (US); Drew Foster Van Duren, Templeton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/482,510

(22) Filed: Sep. 23, 2021

(65) Prior Publication Data

US 2022/0295239 A1    Sep. 15, 2022

Related U.S. Application Data

(60) Provisional application No. 63/158,966, filed on Mar. 10, 2021.

(51) Int. Cl.
| | |
|---|---|
| *H04W 4/00* | (2018.01) |
| *H04L 9/32* | (2006.01) |
| *H04W 4/12* | (2009.01) |
| *H04W 4/021* | (2018.01) |
| *H04W 4/90* | (2018.01) |
| *H04W 4/40* | (2018.01) |

(52) U.S. Cl.
CPC ............. *H04W 4/12* (2013.01); *H04W 4/021* (2013.01); *H04W 4/40* (2018.02); *H04W 4/90* (2018.02)

(58) Field of Classification Search
CPC .......... H04W 4/12; H04W 4/90; H04W 4/40; H04W 4/021
USPC ........................................................ 370/329
See application file for complete search history.

(56) References Cited

U.S. PATENT DOCUMENTS

2020/0221298 A1    7/2020  Pan et al.

OTHER PUBLICATIONS

International Search Report and Written Opinion—PCT/US2022/011227—ISA/EPO—dated May 2, 2022; 12 pages.

*Primary Examiner* — Mark G. Pannell
(74) *Attorney, Agent, or Firm* — The Marbury Law Group

(57) ABSTRACT

Methods and devices for implementing the methods for communicating vehicle-to-everything (V2X) information to a network node include transmitting a first V2X message that is associated with a first service and that includes an identifier of a second service, and transmitting a second V2X message that is associated with the second service and that includes an identifier of the first service configured to enable the network node to use information from the first V2X message with the second service. The network node may receive the first V2X message and the second V2X message, and may use information from the first V2X message with the second service.

33 Claims, 11 Drawing Sheets

Example protocol stack and related core standards for C-ITS in Europe

METHODS AND SYSTEMS FOR COMMUNICATION VEHICLE-TO-EVERYTHING (V2X) INFORMATION

RELATED APPLICATIONS

This application claims the benefit of priority to U.S. Provisional Patent Application No. 63/158,966 entitled "Methods And Systems For Communication Vehicle-To-Everything (V2X) Information" filed Mar. 10, 2021, the entire contents of which are hereby incorporated by reference for all purposes.

BACKGROUND

Multiple regions of the world are developing standards for vehicle-based communication systems and functionality. Standards developed in Institute of Electrical and Electronics Engineers (IEEE) and Society of Automotive Engineers (SAE) for use in North America, or in European Telecommunications Standards Institute (ETSI) and European Committee for Standardization (CEN) for use in Europe. The IEEE 802.11p standard is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-based wireless communications, and may be used to support intelligent highways, autonomous and semi-autonomous vehicles, and improve the overall efficiency and safety of the highway transportation systems. Other V2X wireless technologies are also under consideration in different regions of the world. The techniques described herein are applicable to any V2X wireless technology.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation new radio wireless mobile communication technologies (5G NR systems, etc.), and so forth.

An element of V2X systems is the ability for a vehicle to broadcast Basic Safety Messages (BSM) in North America or Cooperative Awareness Messages (CAM) in Europe, which other vehicles can receive and process to improve traffic safety. The processing of such messages in the transmitting and receiving vehicles occurs in onboard equipment that provide the vehicle-to-everything (V2X) functionality (referred to herein as "V2X onboard equipment").

SUMMARY

Various aspects include methods and V2X nodes configured to perform the methods for communicating V2X information to a network node. Some aspects may include transmitting a first V2X message that is associated with a first service and that includes an identifier of a second service, and transmitting a second V2X message that is associated with the second service and that includes an identifier of the first service configured to enable the network node to use information from the first V2X message with the second service.

Some aspects may include generating the identifier of the first service from a signing certificate of the first service that is associated with the V2X node, and generating the identifier of the second service from a signing certificate of the second service that is associated with the V2X node. In some aspects, generating the identifier of the first service from a signing certificate of the first service that is associated with the V2X node may include generating a hash of the signing certificate of the first service, and generating the identifier of the second service from a signing certificate of the second service that is associated with the V2X node may include generating a hash of the signing certificate of the second service. In some aspects, generating the identifier of the first service from a signing certificate of the first service that is associated with the V2X node may include generating a truncated identifier of the signing certificate of the first service, and generating the identifier of the second service from a signing certificate of the second service that is associated with the V2X node may include generating a truncated identifier of the signing certificate of the second service.

Some aspects may include transmitting a third V2X message that is associated with the second service and that includes a truncated identifier of the first service. In some aspects, the first V2X message may be a basic safety message. In some aspects, the second V2X message may be one of a tolling message, a parking access message, a road condition message, a geonetworking message, or an emergency message.

Various aspects include methods and network nodes configured to perform the methods for receiving V2X information from a V2X node. Some aspects may include receiving from a V2X node a first V2X message that is associated with a first service and that includes an identifier of a second service, receiving from the V2X node a second V2X message that is associated with the second service and that includes an identifier of the first service, and using information from the first V2X message with the second service.

In some aspects, using information from the first V2X message with the second service may include generating an association of the V2X node, the first service, and the second service that enables the network node to use information from the first V2X message with the second service. In some aspects, using information from the first V2X message with the second service may include obtaining information about the V2X node from the first V2X message, and performing an operation for the V2X node related to the second service using the obtained information about the V2X node from the first V2X message. In some aspects, using information from the first V2X message with the second service may include determining whether the first V2X message and the second V2X message were received within a threshold time period, and using the information from the first V2X message with the second service in response to determining that the first V2X message and the second V2X message were received within the threshold time period. In some aspects, the first V2X message may be a basic safety message. In some aspects, the second V2X message may be one of a tolling message, a parking access message, a road condition message, a geonetworking message, or an emergency message.

Further aspects include a V2X node including a memory and a processor configured to perform operations of any of the methods summarized above. Further aspects may include a V2X node having various means for performing functions corresponding to any of the methods summarized above. Further aspects may include a non-transitory processor-readable storage medium having stored thereon processor-executable instructions configured to cause a processor of a V2X node to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
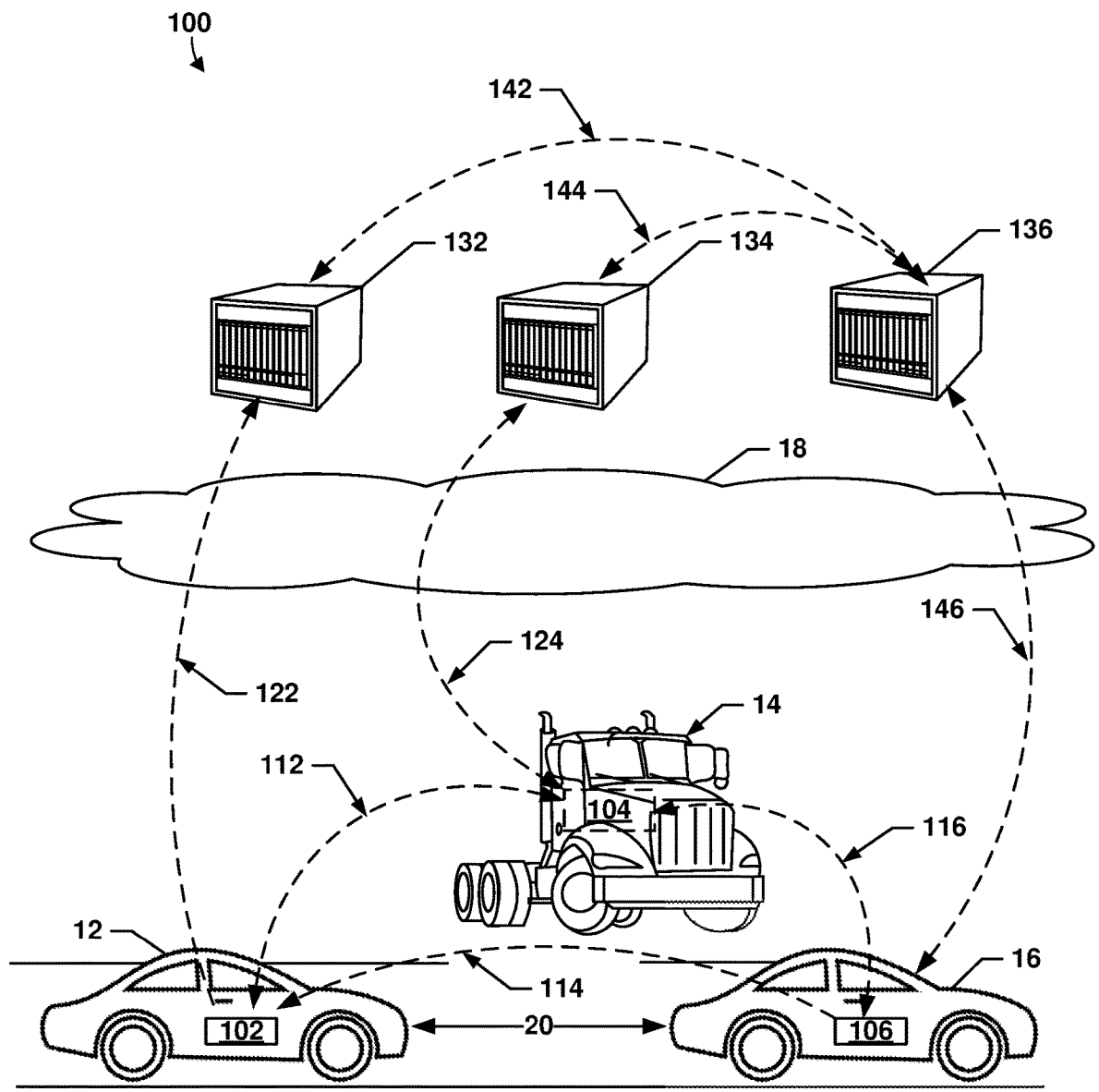
FIG. 1A is a system block diagram illustrating an example V2X system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

V2X processing and communication systems may be implemented in a variety of vehicles, such as automobiles, trucks, buses, trailers, autonomous vehicles, robotic systems and the like. Also, an ITS or other V2X system include a number of fixed equipment installations, such as RSUs, access nodes, and wireless relay nodes. Various embodiments may be implemented in any of a variety of V2X-equipped vehicles, fixed installations, and other devices using V2X communication infrastructure. Further, various embodiments may be useful in systems that are unrelated to ITS functionality but make use of V2X capabilities, such as pay-to-park garages, wireless payment systems for a variety of commercial applications, emergency medical services, etc. To encompass all implementations of various embodiments, the term "V2X node" is used in this description and the claims to refer generally to a mobile, semi-mobile, or fixed system that implements V2X communication functionality. A non-limiting example of a V2X node that is used for describing is a vehicle, such as an automobile paying a toll while traveling on a toll road, but references to this and other examples are not intended to limit the scope of claims reciting a V2X node.

A V2X node (e.g., a vehicle) may transmit various V2X messages related to different services. For example, a V2X node may periodically transmit a Basic Safety Message that may include information about the V2X node, such as an identifier of the V2X node and the V2X node's location, velocity, path, proximate road conditions, proximate vehicles, observed road conditions and vehicle behaviors, etc. As used herein, the term "Basic Safety Message" includes Basic Safety Messages (BSM) as may be used in in North America, Cooperative Awareness Messages (CAM) as may be used in Europe, and other similar messages that may be used according to other Intelligent Transportation System (ITS) protocols or technical standards. The V2X node may also transmit other V2X messages relating to other services. For example, the V2X node may transmit information related to a fee collection or toll collection operation, such as a Tolling Upload Message (TUM) or a similar message, which may include an identifier of the V2X node and the V2X node's location, path, and other information about the V2X node. As another example, the V2X node may transmit an emergency or mayday message, such as an SAE J2735 message, which may include an identifier of the V2X node and the V2X node's location, speed, heading, latitude, longitude, elevation, and other information about the V2X node. As another example, a V2X message used by emergency responders or emergency service providers (e.g., police, fire, emergency medical technicians, etc.) may include location information, identifier(s) of vehicles such as the V2X node, and the like. The information content of the various V2X messages may overlap or be redundant to some extent.

V2X communication systems are typically bandwidth constrained, and may involve numerous participating entities, including many vehicles, roadside units, gantry units, and other network elements, each transmitting numerous V2X messages. Reducing redundancies in information conveyed by V2X messages may decrease the bandwidth overhead incurred by the V2X messages, and may decrease the computational overhead of processing each V2X message. However, common V2X node security mechanisms separate or "sandbox" applications from each other, and grant separate permissions (which may be governed by separately-issued digital signatures or another suitable security measure) to transmitters (e.g., V2X nodes) for different sets of application activities. Thus, it is not trivial to combine messages configured for different services (e.g., BSM, tolling, emergency services, and the like) and apply a single digital signature to cover both or all messages. Further, merely combining messages configured for different services may raise privacy concerns, because applying a single digital signature to many V2X messages may expose the content of all of the V2X messages to any device authorized to view one of the V2X messages.

Various embodiments include methods and mechanisms for efficiently communicating V2X information in an intelligent transportation system (ITS) to other network elements, which may be network elements within the ITS (e.g., another vehicle, a roadside unit (RSU), etc.) or within other networks (e.g., the Internet, private networks, etc.). To encompass network elements that can be in non-ITS system as well as IDS network elements, the term "network node" is used herein to refer to network elements to which an V2X node may transmit V2X messages according to various embodiments. Thus, a "network node" may be any computing device in a network configured to receive V2X messages from a V2X node, including but not limited to V2X nodes.

Various embodiments enable a V2X node (e.g., V2X onboard equipment of a vehicle, a mobile phone, a laptop, tablet, or another suitable computing device) to communicate with a network node (e.g., another vehicle, an RSU, or a gantry unit (such as a tolling gantry unit)) to utilize information provided for a first service by the V2X node in the performance of operations for a second service that is provided by or related to the network node.

As noted above, a V2X node may transmit a variety of V2X messages that may include information content that is redundant. For example, a fee collection or toll collection system (a tolling system) may need to accurately determine a specific lane location lane of a V2X node so that the system may charge the V2X node an appropriate fee or toll (e.g., "lane-level accuracy"). A typical tolling message from the V2X node may include V2X node identity information, an account number or other financial information, and location information, as well as other information about the V2X node. At the same time, a V2X node performing a maneuver may transmit one or more V2X messages to coordinate with other vehicles to ensure that the maneuver can be performed safely and efficiently. Further, all V2X-equipped vehicle routinely share information such as maneuver information, location information, and the like in Basic Safety Messages.

Various embodiments include methods, and V2X nodes and network nodes configured to perform the methods for communicating V2X node information in a manner that improves the efficiency and reduces the processing and communication link overhead required to handle V2X messages. In some embodiments, a V2X node (e.g., a V2X processing device in V2X onboard equipment of a vehicle) may transmit for reception by a network node a first V2X message that is associated with a first service and that includes an identifier of a second service, and may transmit a second V2X message that is associated with a second service and that includes an identifier of the first service configured to enable the network node to use information from the first V2X message with the second service. In various embodiments, the inclusion of the identifiers of the services with the V2X messages of the other services may enable the receiving network node to create an association between messages from the V2X node for the first service and messages from the V2X node for the second service, and thereby enabling the network node to use information provided by the V2X node in a message for the first service in performing operations on behalf of the V2X node for the second service. In this manner, the V2X node may generate a V2X message for the second service that includes the identifier for the first service, rather than including in the V2X message for the second service information that is redundant to information in the V2X message for the first service. For example, the V2X node may transmit Basic Safety Messages that include node identification information and a location of the V2X node. The V2X node may also transmit a tolling message that refers to the Basic Safety Message, enabling a receiving network node to use the identification information and/or location information from the Basic Safety Message.

The terms "first message" and "second message" are used to distinguish each message, are not intended to require an order or sequence of the messages, and are not intended to be limiting to just two messages. Further, any number of "first" messages and any number of "second" messages may be transmitted. Further, additional messages, referred to generally herein as a "third message" may also be transmitted incorporating elements of various embodiments. Similarly, the terms "first service" and "second service" are used to distinguish each service. In some embodiments, information from the first service may be used in performing an operation of the second service. In some embodiments, the information of the first service may be provided in a message of the first service. In some embodiments, information from the second service may be used in performing an operation of the first service. In some embodiments, the information of the second service may be provided in a message of the second service.

In some embodiments, the V2X node may generate an identifier from a signing certificate associated with a service. In some embodiments, the V2X node may generate the identifier of the first service from a signing certificate of the first service that is associated with the V2X node, and may generate the identifier of the second service from a signing certificate of the second service that is associated with the V2X node. In this manner, each V2X message may include an identifier that is secure and verifiable by the receiving network node.

In some embodiments, the V2X node may generate the identifier of the first service by generating a hash of the signing certificate of the first service, and may generate the identifier of the second service by generating a hash of the signing certificate of the second service. In some embodiments, after the association between messages for the first service and the second service is established, the V2X node may generate a shortened or truncated identifier for the first service in the second service to further reduce an amount of data in each V2X message. In some embodiments, the truncated identifier may be as small as the last three or four bytes in the full hash identifier. In some embodiments, the V2X node may generate a truncated hash of the signing certificate of the first service (e.g., the last three or four bytes in the full hash certificate), and may generate a truncated hash of the signing certificate of the second service (e.g., the last three or four bytes in the full hash certificate). In some embodiments, the receiving network node may readily identify the truncated identifier of the signing certificate of each service as related to the full or larger identifier of each service's signing certificate.

In some embodiments, the V2X node may determine whether a similar certificate has been used by another vehicle or network node within a threshold radius and/or a threshold period of time. In response to determining that a similar certificate has not been used by another vehicle or network node within a threshold radius and/or a threshold period of time, the V2X node may generate and use a truncated identifier for data included in the message for a service.

In some embodiments, the V2X node may intersperse V2X messages including the full or larger identifier of a service among V2X messages that use a truncated identifier of the service. In this manner, the transmitting V2X node may be locally unambiguous about the signing certificate associated with the V2X node and the service, while periodically including the larger identifier, which is more cryptographically secure. For example, an attacker may record a communication session (i.e., V2X messages related to a service) and replace V2X messages signed by a signature of the V2X node with messages signed by a certificate of the attacker. While the attacker may be able to identify a usable certificate based on the truncated identifier, identifying a certificate with the longer identifier is infeasible. In this manner, interspersing V2X messages including the larger identifier of the service may increase the security of the V2X communications.

In some embodiments, the first V2X message may be a basic safety message. In some embodiments, the second V2X message may be related to another service. For example, the second V2X message may be a tolling message (e.g., for a fee collection or toll collection system), a parking access message (e.g., for a parking payment system), a road condition message (e.g., a message to the another vehicle, to an RSU, or to a network node about traffic, observed vehicle behavior, road damage, a dangerous road condition such as ice or flooding, etc.), a geonetworking message (e.g., for use in a geonetworking message or messaging system), an emergency responder message (e.g., police, fire, emergency medical technician, or other emergency responder system), or another suitable message or messaging system.

In various embodiments, the network node may receive from the V2X node a first V2X message that is associated with the first service and that includes the identifier of a second service, and may receive from the V2X node the second V2X message that is associated with the second service and that includes an identifier of the first service. In some embodiments, the network node may generate an association of the V2X node, the first service, and the second service that enables the network node to use information from the first V2X message with the second service. In some embodiments, the network node may use information from the first V2X message with the second service. In some embodiments, the network node may obtain information about the V2X node from the first V2X message, and may perform an operation for the V2X node related to the second service using the obtained information about the V2X node from the first V2X message.

In some embodiments, the network node may determine whether the first V2X message and the second V2X message were received within a threshold time period. In response to determining that the first V2X message and the second V2X message were received within the threshold time period, the network node may use the information from the first V2X message with the second service. In this manner, the network node may increase the security of the association between V2X messages of the first service and of the second service, as well as avoid using data that may no longer be accurate (e.g., the location of a moving vehicle).

In this manner, various embodiments include methods, V2X processing devices, and network elements configured to perform the methods for communicating V2X information in V2X messages in a manner that improves the efficiency and reduces the processing and communication link overhead required to handle such V2X messages.

For ease of reference, some of the embodiments are described in this application with reference to a vehicle using vehicle-to-everything (V2X) systems and protocols. However, it should be understood that various embodiments encompass any or all of the V2X or vehicle-based communication standards, messages or technologies. As such, nothing in the application should be construed to limit the claims to V2X systems, Basic Safety Messages (BSMs), or V2X messages unless expressly recited as such in the claims. In addition, the embodiments described herein may refer to a V2X processing system in a vehicle. Other embodiments are contemplated in which the V2X processing system may operate in or be included in mobile devices, mobile computers, road side units (RSU), and other devices that are equipped to monitor road and vehicle conditions and to participate in V2X communications.

Figure 1B:
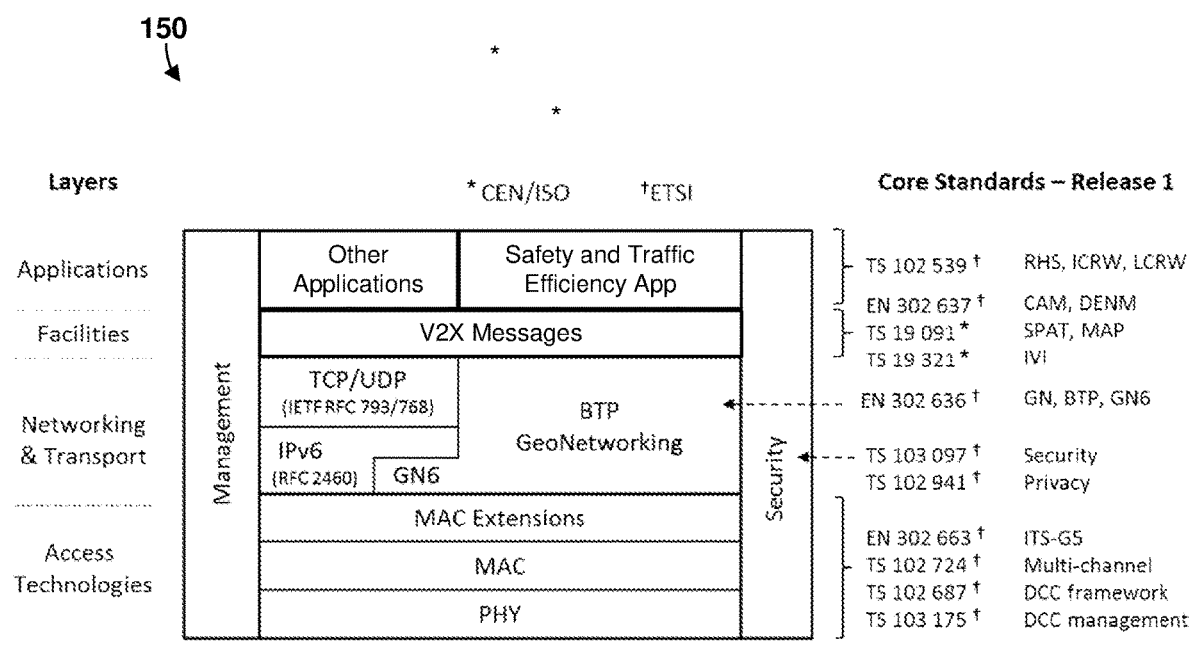
FIG. 1B is a conceptual diagram illustrating an example V2X communication protocol stack suitable for implementing various embodiments.

FIG. 1A is a system block diagram illustrating an example V2X system 100 suitable for implementing various embodiments. FIG. 1B is a conceptual diagram illustrating an example V2X communication protocol stack 150 suitable for implementing various embodiments. With reference to FIGS. 1A and 1B, each vehicle 12, 14, 16 includes V2X onboard equipment 102, 104, 106, respectively, that are configured to transmit and receive V2X messages, including periodically broadcasting Basic Safety Messages 112, 114, 116 for receipt and processing by other vehicles' onboard equipment (e.g., 102, 104, 106).

By sharing the vehicle location, speed, direction, braking, and other information, vehicles can maintain safe separation and identify and avoid potential collisions. For example, a trailing vehicle 12 receiving Basic Safety Messages 114 from a leading vehicle 16 can determine the speed and location of the vehicle 16, enabling vehicle 12 to match the speed and maintain a safe separation distance 20. By being informed through Basic Safety Messages 114 when the leading vehicles 16 applies the brakes, the V2X equipment 102 in the trailing vehicle 12 can apply brakes simultaneously to maintain the safe separation distance 20 even when the leading vehicle 16 stopped suddenly. As another example, the V2X equipment 104 within the truck vehicle 14 may receive Basic Safety Messages 112, 116 from the two vehicles 12, 16, and thus be informed that the truck vehicle 14 should stop at the intersection to avoid a collision. Further, each of the vehicle V2X on-board equipment 102, 104, 106 may communicate with one another using any of a variety close proximity communication protocols.

In addition, the vehicles may be able to transmit data and information regarding Basic Safety Messages and other V2X communications to a variety of network elements 132, 134, 136 via communication links 122, 124, 146 through a communication network 18 (e.g., V2X, cellular, WiFi, etc.) For example, network element 132 may be incorporate into, or may be in communication with, an RSU, a gantry unit, and/or the like. The network element 134, 136 may be configured to perform a function or service related to a vehicle 12, 14, 16, such as payment processing, road condition monitoring, emergency provider message handling, and the like. The network element 134, 136 may be configured to communicate with one another through wired or wireless networks 142, 144 to exchange information associated with payment processing, road condition monitoring, emergency provider message handling, and similar services.

Figure 2:
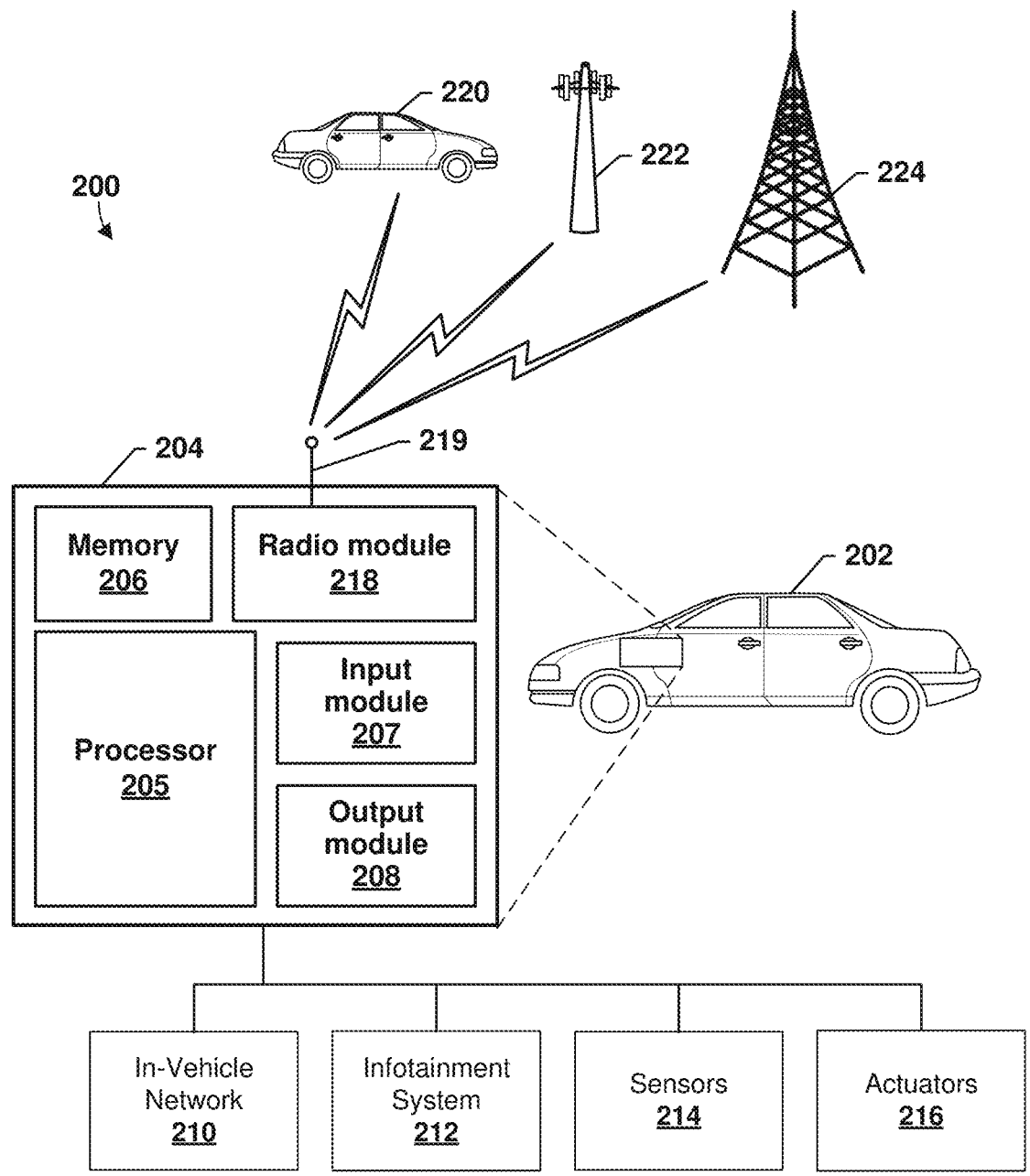
FIG. 2 is a component diagram of an example vehicle system including a block diagram of an example of V2X onboard equipment suitable for implementing various embodiments.

FIG. 2 is a component diagram of an example vehicle system 200 suitable for implementing various embodiments. With reference to FIGS. 1A-2, the system 200 may include a vehicle 202 that includes a vehicle processing system 204 (for example, a telematics control unit or on-board unit (TCU/OBU). The V2X processing device 202 may communicate with various systems and devices, such as an in-vehicle network 210, an infotainment system 212, various sensors 214, various actuators 216, and a radio module 218. The V2X processing device 202 also may communicate with various other vehicles 220, roadside units 222, base stations 224, and other external devices. The vehicle processing system 204 may be configured to perform operations for authenticating plaintext and ciphertext as further described below.

The vehicle processing device 204 may include a processor 205, memory 206, an input module 207, an output module 208 and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The vehicle processing system 204 may include a V2X antenna 219 coupled to the radio module 218 that is configured to communicate with one or more ITS stations such as another vehicle 220, a roadside unit 222, and a base station 224 or another suitable network access point. In various embodiments, the V2X processing device 202 may receive information from a plurality of information sources, such as the in-vehicle network 210, infotainment system 212, various sensors 214, various actuators 216, and the radio module 218. The V2X processing device 202 may detect a misbehavior condition in a system of the vehicle, such as one of the plurality of information sources 210-218, an application or service executing on the V2X processing device 202, or another system of the vehicle.

Examples of an in-vehicle network include a Controller Area Network (CAN), a Local Interconnect Network (LIN), a network using the FlexRay protocol, a Media Oriented Systems Transport (MOST) network, and an Automotive Ethernet network. Examples of vehicles sensors include a location determining system (such as a Global Navigation Satellite Systems (GNSS) system, a camera, radar, lidar, ultrasonic sensors, infrared sensors, and other suitable sensor devices and systems. Examples of vehicle actuators include various physical control systems such as for steering, brakes, engine operation, lights, directional signals, and the like.

Figure 3A:
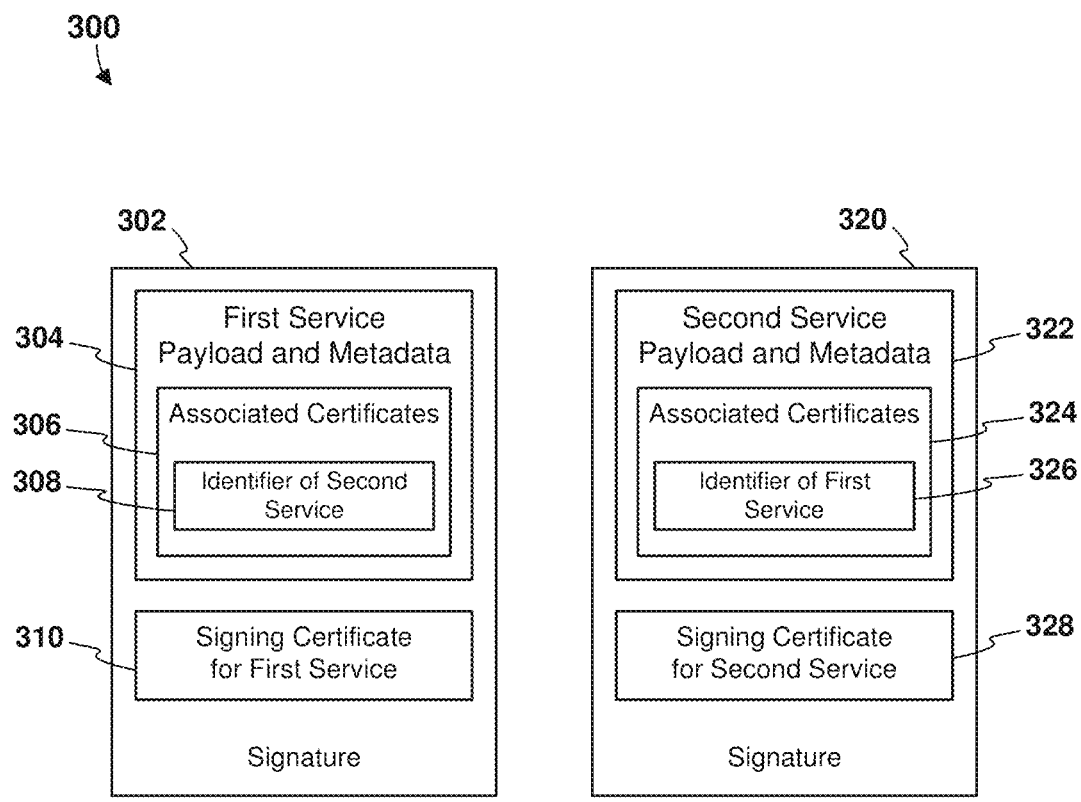
FIG. 3A is a conceptual diagram illustrating an example of V2X messages suitable for implementing various embodiments.
Figure 3B:
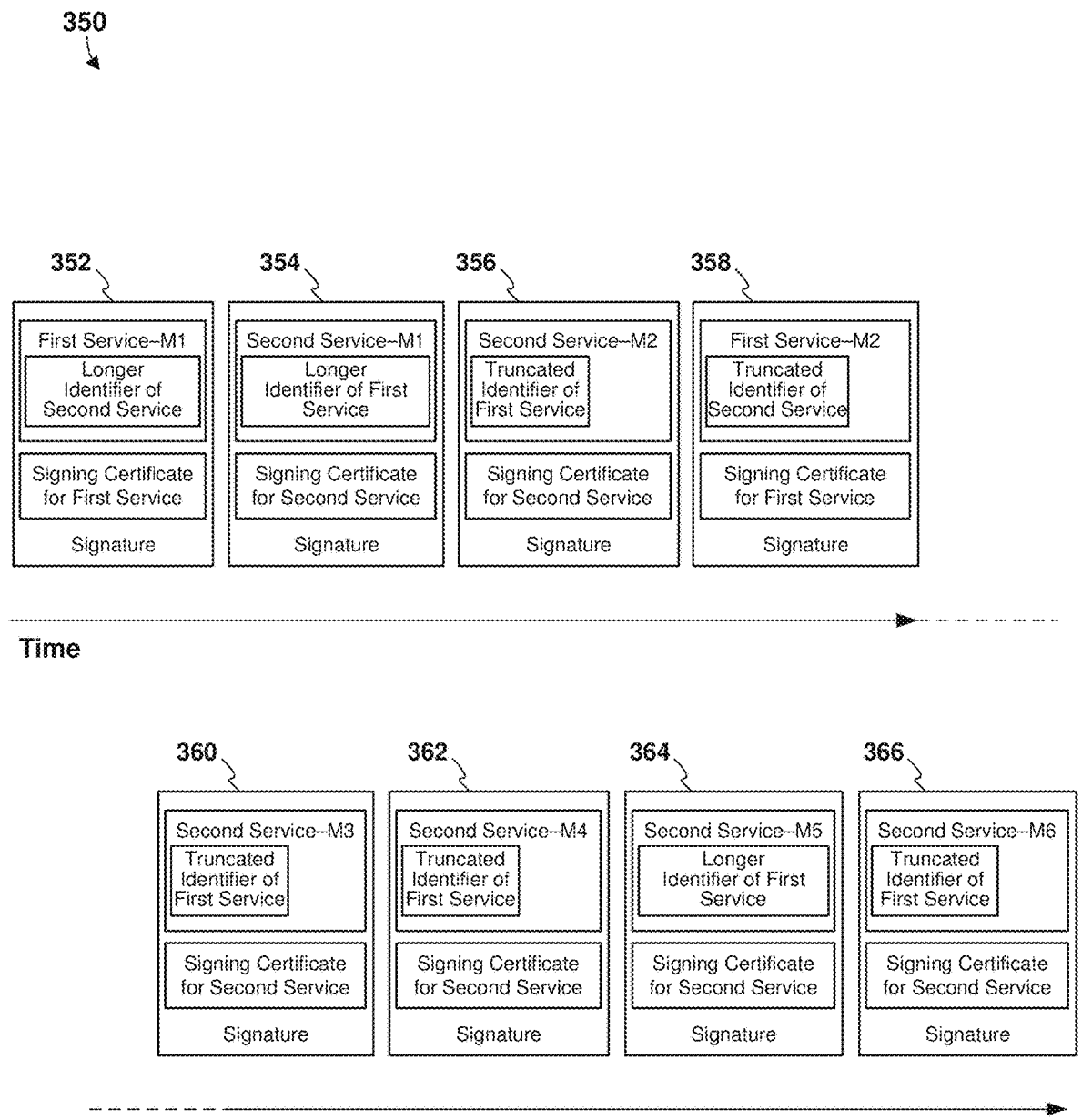
FIG. 3B is a conceptual diagram illustrating an example message flow suitable for implementing various embodiments.

FIG. 3A is a conceptual diagram illustrating an example of a V2X messages 300 suitable for implementing various embodiments. FIG. 3B is a conceptual diagram illustrating an example message flow 350 suitable for implementing various embodiments. With reference to FIGS. 1-3B, the V2X messages 300 and the message flow 350 may be implemented by a vehicle processing system (e.g., 204) of a V2X node (e.g., the vehicle 12, 14, 16, 202) and a processor of a network node (e.g., another of the vehicles 12, 14, 16, 220, the RSU 132, the network elements 134, 136).

A first V2X message 302 may include information such as a payload (e.g., data or information) and/or metadata 304 related to a first service. The first V2X message 302 may include one or more certificates 306 associated with the first service. The first V2X message 302 may also include an identifier of the second service 308. The first V2X message 302 may include a signing certificate for the first service 310. The first V2X message 302 may include or be associated with a digital signature (i.e., the first V2X message 302 may be digitally signed). In some embodiments, the first V2X message 302 may be a basic safety message.

A second V2X message 320 may include information such as a payload (e.g., data or information) and/or metadata 322 related to a second service. The second V2X message 320 may include one or more certificates 324 associated with the second service and a signing certificate for the first service 328. The second V2X message 320 may also include an identifier of the first service 326. The second V2X message 320 may include or be associated with a digital signature (i.e., the second V2X message 320 may be digitally signed).

Referring to FIG. 3B, the message flow 350 (e.g., which may be sent by the V2X node) may include V2X messages 352-366. V2X messages for each of the first service and second service may include an identifier of the other service. For example, V2X message 352 of the first service may include a longer identifier of the second service, and V2X message 354 of the second service may include a longer identifier of the first service. The inclusion in each V2X message of an identifier for the other V2X service may enable a receiving device (e.g., a network node) to associate the two services and/or messages from the two services with respect to the V2X node. In some embodiments, the network node may generate an association of the V2X node, the first service, and the second service. Such association may enable the network node to use information from the first V2X message in performing operations of the second service for the V2X node.

V2X messages that are sent/received after V2X messages 352 and 354, such as V2X messages 356 and 358, may include a truncated identifier of the other service. In some embodiments, the identifier of the other service may be or may include a certificate of the other service. In some embodiments, the longer identifier may be a full-sized hash of the certificate of the other service. In some embodiments, the truncated identifier may be a truncated hash of the certificate of the other service. In some embodiments, the truncated identifier may include sufficient information to uniquely identify the longer identifier. For example, a truncated hash of a certificate may include sufficient information (e.g., may be a string of sufficient length) to uniquely identify the full-length or full-size hash of the certificate.

In some embodiments, the V2X node may intersperse V2X messages including the full or larger identifier of a service among V2X messages that use a truncated identifier of the service. For example, the V2X messages 360, 362, and 366 may include the truncated identifier of the first service, and the V2X message 364 that is interspersed between V2X messages 362 and 366 may include the longer identifier of the first service. In various embodiments, the larger identifier is more cryptographically secure than the truncated identifier. In this manner, the V2X node may reduce an overall amount or volume of data transmitted over a V2X node communication link while maintaining a sufficient level of security to thwart an attacker by periodically including the longer identifier.

Figure 4:
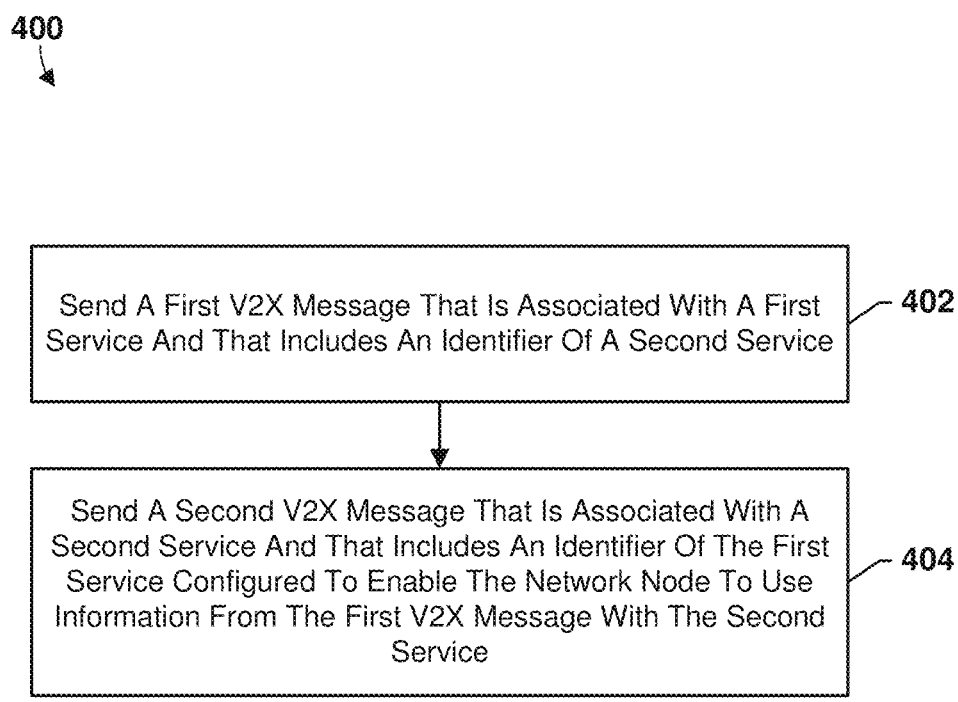
FIG. 4 is a process flow diagram illustrating a method 400 performed by a processor of a V2X node for communicating V2X information to a network node according to various embodiments.

FIG. 4 is a process flow diagram illustrating a method 400 performed by a processor of a V2X node for communicating V2X information to a network node according to various embodiments. With reference to FIGS. 1-4, the operations of the method 400 may be performed by a V2X processing device in a V2X node (e.g., 12, 14, 16, 202).

In block 402, V2X processing device may transmit a first V2X message that is associated with a first service and that includes an identifier of a second service. For example, the V2X processing device may transmit a basic safety message that includes an identifier of a second service. In some embodiments, the second service may include a tolling service, a parking access service, a road condition monitoring service, a geonetworking is service, or an emergency response service. Means for performing the operations of block 402 may include the V2X onboard equipment 102, 104, 106, the vehicle processing system 204, the processor 205, the radio module 218, and the antenna 219.

In block 404, the V2X processing device may transmit a second V2X message that is associated with the second service and that includes an identifier of the first service configured to enable the network node to use information from the first V2X message with the second service. For example, the second V2X message may be a tolling message, a parking access message, a road condition message, a geonetworking message, or an emergency responder message. The second V2X message may include an identifier of the first service (i.e., the basic safety message service). In various embodiments, including the identifier of the second service in the first V2X message and the identifier of the first service in the second V2X message may enable the network node to use information from the first V2X message (e.g., the basic safety message) with the second service. Means for performing the operations of block 404 may include the V2X onboard equipment 102, 104, 106, the vehicle processing system 204, the processor 205, the radio module 218, and the antenna 219.

As noted above, the V2X processing device may transmit any number of first V2X messages and any number of second V2X messages in the method 400. Further, in some embodiments, the V2X processing device may transmit a third V2X message that is associated with the second service and that includes a truncated identifier of the first service.

Figure 5:
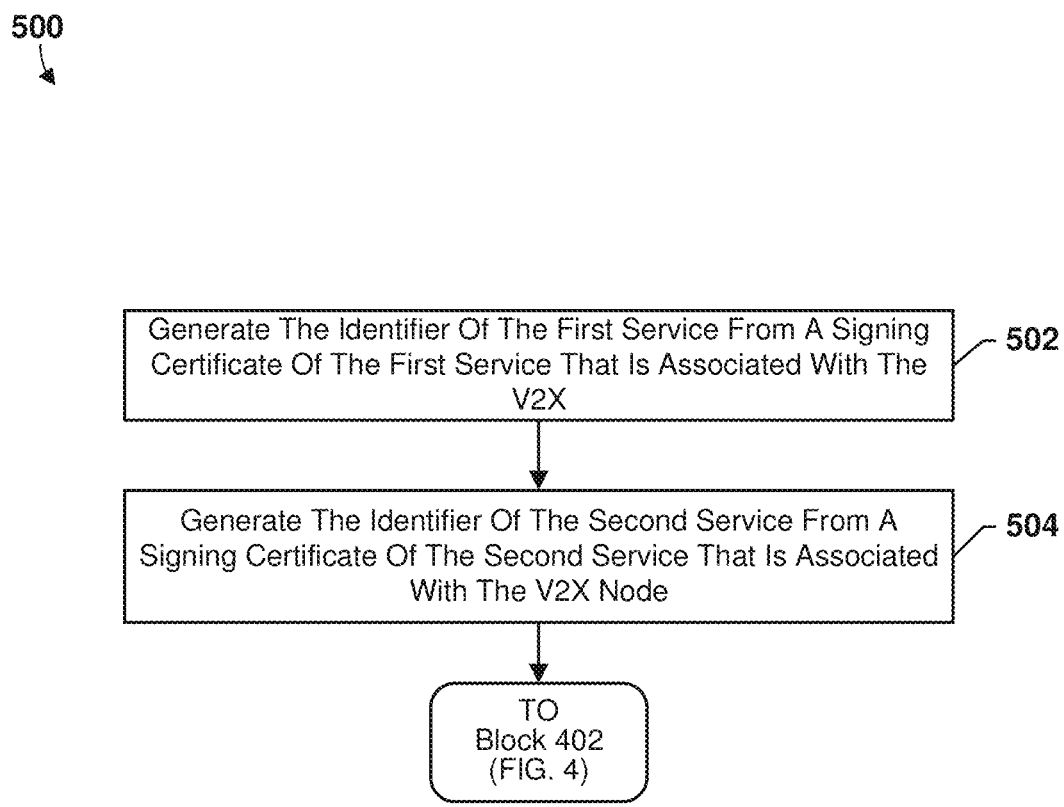
FIG. 5 is a process flow diagram illustrating operations 500 that may be performed by a processor of a V2X node as part of the method 400 for communicating V2X information to a network node according to some embodiments.

FIG. 5 is a process flow diagram illustrating operations 500 that may be performed by a processor of a V2X node as part of the method 400 for communicating V2X information to a network node according to various embodiments. With reference to FIGS. 1-5, the operations of the operations 500 may be performed by a V2X processing device in a V2X node (e.g., 12, 14, 16, 202).

In block 502, the V2X processing device may generate the identifier of the first service from a signing certificate of the first service that is associated with the V2X node. In some embodiments, the V2X processing device may generate the identifier of the first service by generating a hash of the signing certificate of the first service. In some embodiments, the V2X processing device may generate the identifier of the first service by generating a truncated hash of the signing certificate of the first service. Means for performing the operations of block 502 may include the V2X onboard equipment 102, 104, 106, the vehicle processing system 204, and the processor 205.

In block 504, the V2X processing device may generate the identifier of the second service from a signing certificate of the second service that is associated with the V2X node. In some embodiments, the V2X processing device may generate the identifier of second first service by generating a hash of the signing certificate of the second service. In some embodiments, the V2X processing device may generate the identifier of the second service by generating a truncated hash of the signing certificate of the second service. Means for performing the operations of block 504 may include the V2X onboard equipment 102, 104, 106, the vehicle processing system 204, and the processor 205.

Following the operations of block 504, the V2X processing device may proceed to perform the operations of block 402 of the method 400 as described.

Figure 6:
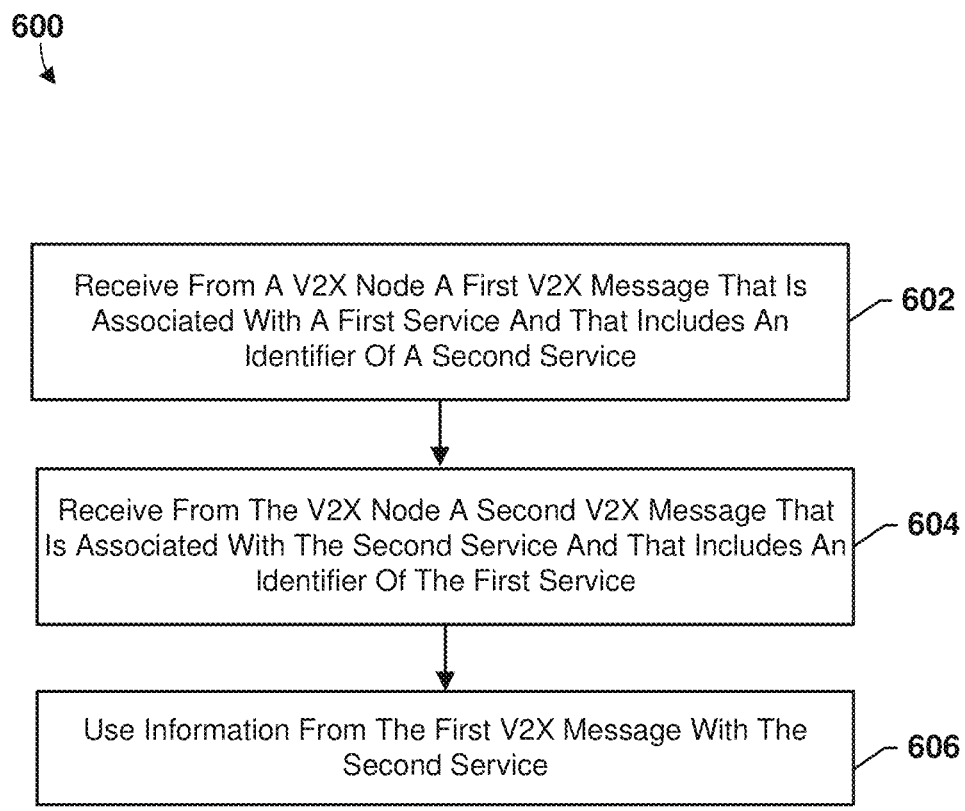
FIG. 6 is a process flow diagram illustrating a method 600 performed by a processor of a network node for receiving V2X information from a V2X node according to various embodiments.

FIG. 6 is a process flow diagram illustrating a method 600 performed by a processor of a network node for receiving V2X information from a V2X node according to various embodiments. With reference to FIGS. 1-6, the operations of the method 600 may be performed by a processing device (which may be a V2X processing device) in a network node (e.g., 12, 14, 16, 132, 134, 136, 220, 222, 224).

In block 602, the processing device may receive from a V2X node a first V2X message that is associated with a first service and that includes an identifier of a second service. Means for performing the operations of block 602 may include the V2X onboard equipment 102, 104, 106, the vehicle processing system 204, the processor 205, the radio module 218, and the antenna 219.

In block 604, the processing device may receive from the V2X node a second V2X message that is associated with the second service and that includes an identifier of the first service. Means for performing the operations of block 604 may include the V2X onboard equipment 102, 104, 106, the vehicle processing system 204, the processor 205, the radio module 218, and the antenna 219.

In block 606, the processing device may use information from the first V2X message with the second service. In some embodiments, the processing device may obtain information about the V2X node from the first V2X message, and may perform an operation for the V2X node related to the second service using the obtained information about the V2X node from the first V2X message. In some embodiments, the processing device may generate an association of the V2X node, the first service, and the second service that enables the network node to use information from the first V2X message with the second service. Means for performing the operations of block 602 may include the V2X onboard equipment 102, 104, 106, and the vehicle processing system 204.

Figure 7:
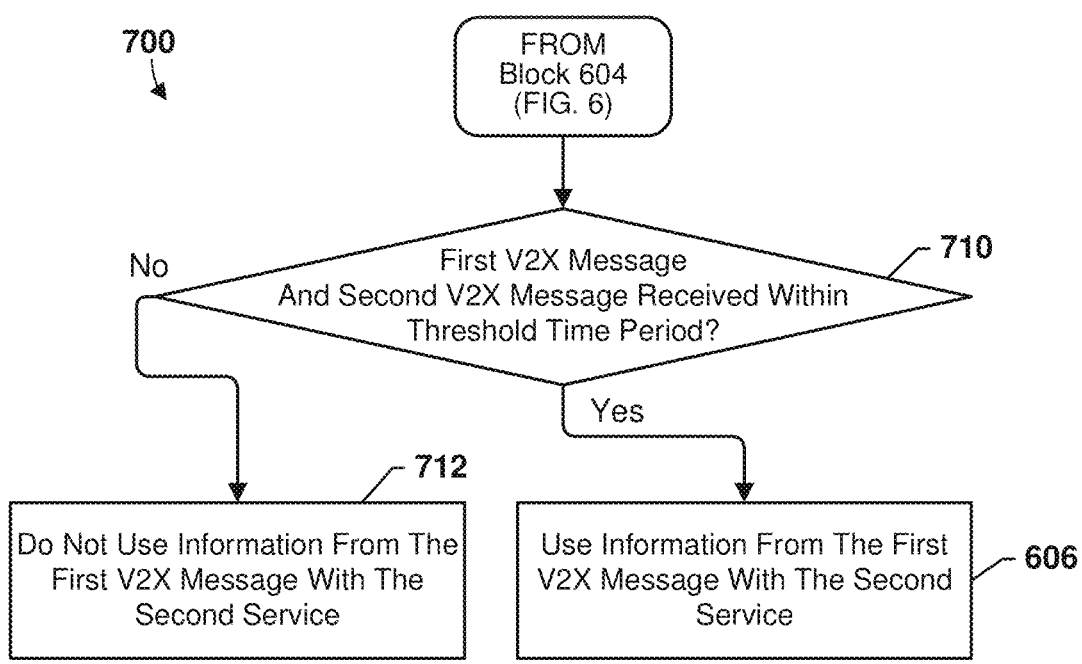
FIG. 7 is a process flow diagram illustrating operations 700 that may be performed by a processor of a V2X node as part of the method 600 receiving V2X information from a V2X node according to some embodiments.

FIG. 7 is a process flow diagram illustrating operations 700 that may be performed by a processor of a V2X node as part of the method 600 receiving V2X information from a V2X node according to various embodiments. With reference to FIGS. 1-7, the operations of the operations 700 may be performed by a processing device (which may be a V2X processing device) in a network node (e.g., 12, 14, 16, 132, 134, 136, 220, 222, 224).

After performing the operations of block 604 (FIG. 6), the processing device may determine whether the first V2X message and the second V2X message were received within a threshold time period in determination block 710. In some embodiments, the processing device may determine whether the first V2X message and the second V2X message were received within a threshold time period from each other. Means for performing the operations of determination block 710 may include the V2X onboard equipment 102, 104, 106, the vehicle processing system 204, and the processor 205.

In response to determining that the first V2X message and the second V2X message were not received within a threshold time period (i.e., determination block 710="No"), the processing device may not use the information from the V2X message with the second service in block 712. In some embodiments, the processor may prevent generation of an association of the V2X node, the first service, and the second service in response to determining that the first V2X message and the second V2X message were not received within a threshold time period. Means for performing the operations of determination block 712 may include the V2X onboard equipment 102, 104, 106, the vehicle processing system 204, and the processor 205.

In response to determining that the first V2X message and the second V2X message were received within a threshold time period (i.e., determination block 710="Yes"), the processing device may perform the operations of block 606 of the method 600 (FIG. 6) as described.

Figure 8:
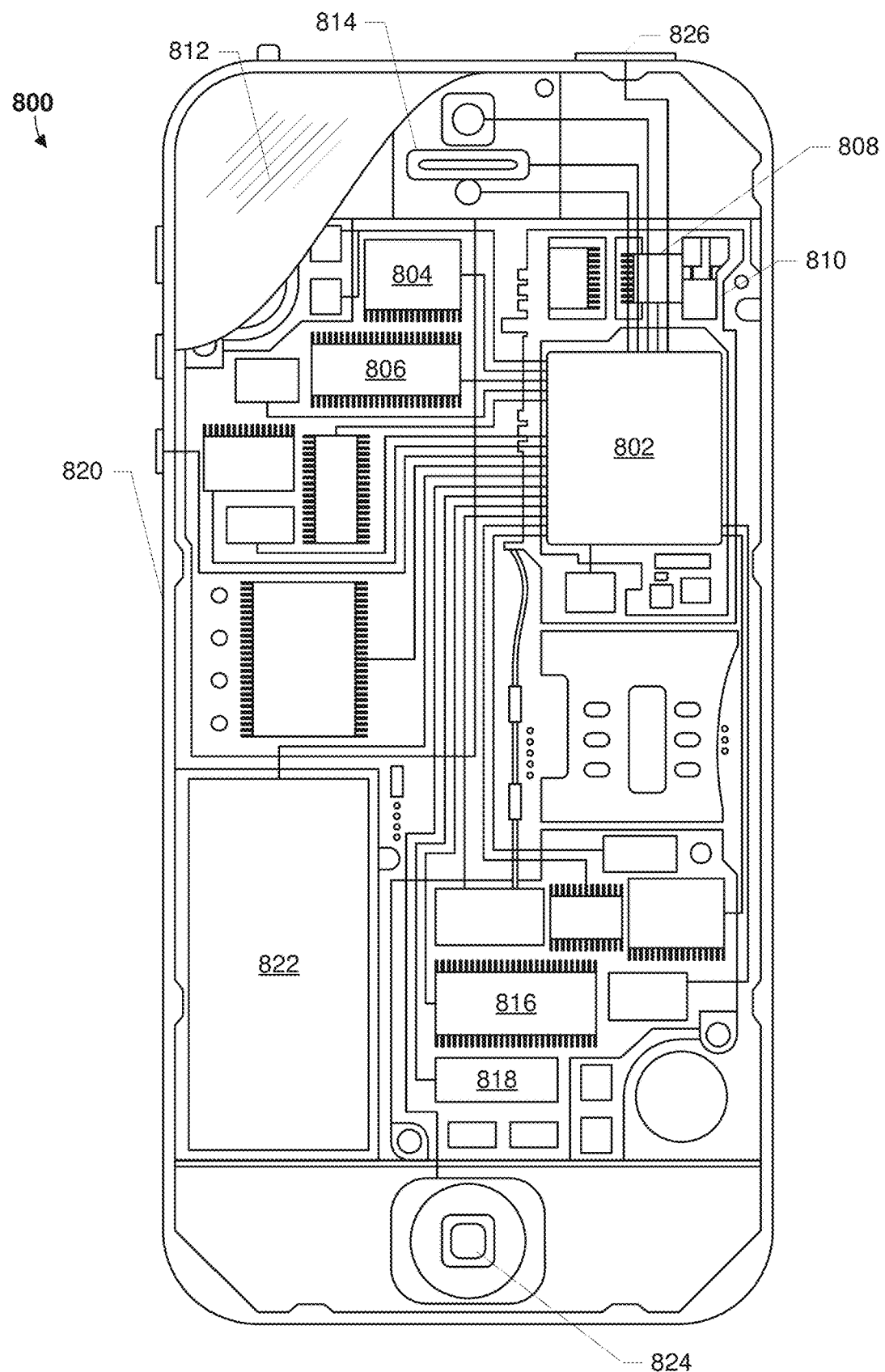
FIG. 8 is a component block diagram illustrating an example mobile computing device suitable for use with various embodiments.

FIG. 8 is a component block diagram illustrating an example mobile computing device 800 suitable for use with various embodiments. With reference to FIGS. 1-8, various embodiments may be implemented in a wide variety of computing systems including on-board equipment as well as mobile computing devices, including the example mobile computing device 800. The mobile computing device 800 may include a processor 802 coupled to a touchscreen controller 804 and an internal memory 806. The processor 802 may be one or more multicore integrated circuits designated for general or specific processing tasks. The internal memory 806 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the mobile computing device 800 need not have touch screen capability.

The mobile computing device 800 may have one or more radio signal transceivers 808 (e.g., Peanut, Bluetooth, Zig-Bee, Wi-Fi, RF radio) and antennae 810, for transmitting and receiving communications, coupled to each other and/or to the processor 802. The transceivers 808 and antennae 810 may be used with the above-mentioned circuitry to implement the various wireless transmission protocol stacks and interfaces. The mobile computing device 800 may include a cellular network wireless modem chip 816 that enables communication via a cellular network and is coupled to the processor.

The mobile computing device 800 may include a peripheral device connection interface 818 coupled to the processor 802. The peripheral device connection interface 818 may be singularly configured to accept one type of connection, or may be configured to accept various types of physical and communication connections, common or proprietary, such as Universal Serial Bus (USB), FireWire, Thunderbolt, or PCIe. The peripheral device connection interface 818 may also be coupled to a similarly configured peripheral device connection port (not shown).

The mobile computing device 800 may also include speakers 814 for providing audio outputs. The mobile computing device 800 may also include a housing 820, constructed of a plastic, metal, or a combination of materials, for containing all or some of the components described herein. One of ordinary skill in the art may recognize that the housing 820 may be a dashboard counsel of a vehicle in an on-board embodiment. The mobile computing device 800 may include a power source 822 coupled to the processor 802, such as a disposable or rechargeable battery. The rechargeable battery may also be coupled to the peripheral device connection port to receive a charging current from a source external to the mobile computing device 800. The mobile computing device 800 may also include a physical button 824 for receiving user inputs. The mobile computing device 800 may also include a power button 826 for turning the mobile computing device 800 on and off.

Figure 9:
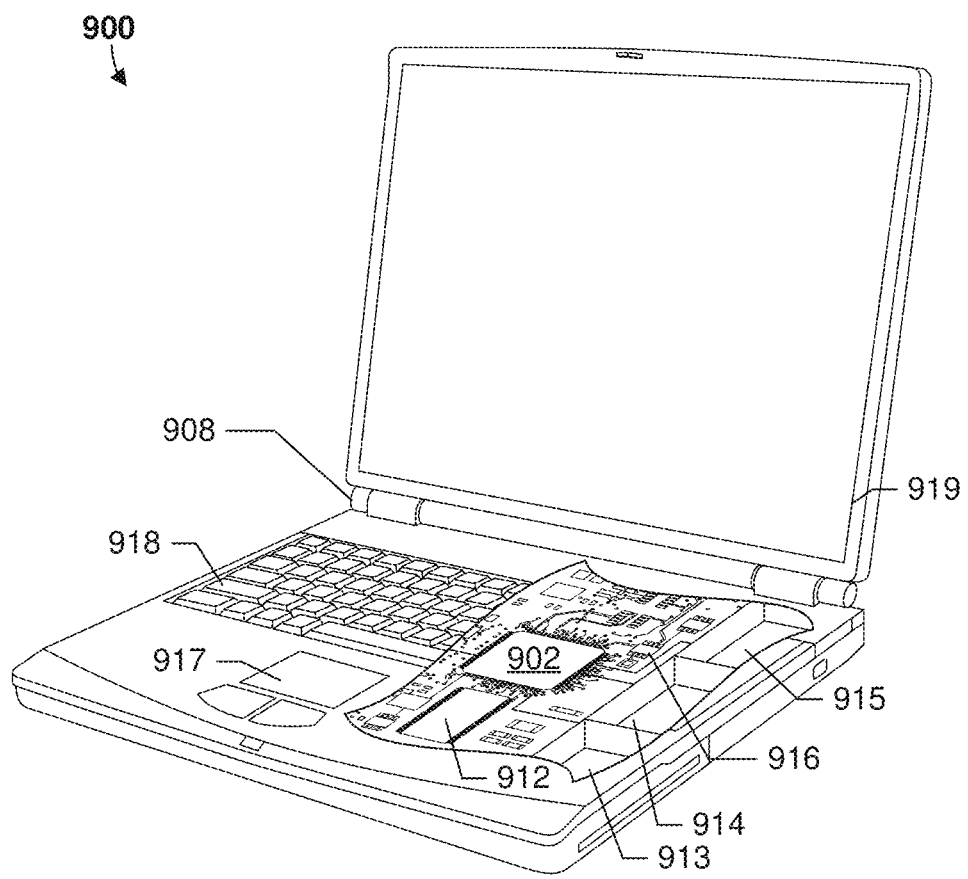
FIG. 9 is a component block diagram illustrating an example mobile computing device suitable for use with various embodiments.

FIG. 9 is a component block diagram illustrating an example mobile computing device 900 suitable for use with various embodiments. With reference to FIGS. 1-9, various embodiments may be implemented in a wide variety of computing systems including the example mobile computing device 900, which is illustrated as a laptop computer. The mobile computing device 900 may include a touchpad touch surface 917 that serves as the computer's pointing device, and thus may receive drag, scroll, and flick gestures similar to those implemented on computing devices equipped with a touch screen display and described above. A mobile computing device 900 will typically include a processor 902 coupled to volatile memory 912 and a large capacity nonvolatile memory, such as a disk drive 913 of FLASH memory. Additionally, the mobile computing device 900 may have one or more antenna 908 for transmitting and receiving electromagnetic radiation that may be connected to a wireless data link and/or cellular telephone transceiver 916 coupled to the processor 902. The mobile computing device 900 may also include a floppy disc drive 914 and a compact disc (CD) drive 915 coupled to the processor 902. In a notebook configuration, the computer housing includes the touchpad 917, the keyboard 918, and the display 919 all coupled to the processor 902. Other configurations of the computing device may include a computer mouse or trackball coupled to the processor (e.g., via a USB input) as are well known, which may also be used in conjunction with various embodiments.

Implementation examples are described in the following paragraphs. While some of the following implementation examples are described in terms of example methods, further example implementations may include: the example methods discussed in the following paragraphs implemented by a V2X processing device that may be an on-board unit, mobile device unit, mobile computing unit, or stationary roadside unit), a network node, or a computing device, including a processor configured with processor-executable instructions to perform operations of the methods of the following implementation examples; the example methods discussed in the following paragraphs implemented by a V2X processing device, a network node processing device, or a network computing node processing device including means for performing functions of the methods of the following implementation examples; and the example methods discussed in the following paragraphs may be implemented as a non-transitory processor-readable storage medium having stored thereon processor-executable instructions configured to cause a processor of a V2X processing device, a network node processing device, or a network computing node processing device to perform the operations of the methods of the following implementation examples.

Example 1. A method performed by a processor of a vehicle-to-everything (V2X) node for communicating V2X information to a network node, including transmitting a first V2X message that is associated with a first service and that includes an identifier of a second service; and transmitting a second V2X message that is associated with the second service and that includes an identifier of the first service configured to enable the network node to use information from the first V2X message with the second service.

Example 2. The method of example 1, further including generating the identifier of the first service from a signing certificate of the first service that is associated with the V2X node; and generating the identifier of the second service from a signing certificate of the second service that is associated with the V2X node.

Example 3. The method of example 2, in which generating the identifier of the first service from a signing certificate of the first service that is associated with the V2X node includes generating a hash of the signing certificate of the first service; and generating the identifier of the second service from a signing certificate of the second service that is associated with the V2X node includes generating a hash of the signing certificate of the second service.

Example 4. The method of either of examples 2 or 3, in which generating the identifier of the first service from a signing certificate of the first service that is associated with the V2X node includes generating a truncated identifier of the signing certificate of the first service; and generating the identifier of the second service from a signing certificate of the second service that is associated with the V2X node includes generating a truncated identifier of the signing certificate of the second service.

Example 5. The method of any of examples 2-4, further including transmitting a third V2X message that is associated with the second service and that includes a truncated identifier of the first service.

Example 6. The method of any of examples 1-5, in which the first V2X message is a basic safety message.

Example 7. The method of any of examples 1-6, in which the second V2X message is one of a tolling message, a parking access message, a road condition message, a geonetworking message, or an emergency message.

Example 8. A method performed by a processor of a network node for receiving vehicle-to-everything (V2X) information from a V2X node, including receiving from a V2X node a first V2X message that is associated with a first service and that includes an identifier of a second service; receiving from the V2X node a second V2X message that is associated with the second service and that includes an identifier of the first service; and using information from the first V2X message with the second service.

Example 9. The method of example 8, in which using information from the first V2X message with the second service includes generating an association of the V2X node, the first service, and the second service that enables the network node to use information from the first V2X message with the second service.

Example 10. The method of either example 8 or 9, in which using information from the first V2X message with the second service includes obtaining information about the V2X node from the first V2X message; and performing an operation for the V2X node related to the second service using the obtained information about the V2X node from the first V2X message.

Example 11. The method of any of examples 8-10, in which using information from the first V2X message with the second service includes determining whether the first V2X message and the second V2X message were received within a threshold time period; and using the information from the first V2X message with the second service in response to determining that the first V2X message and the second V2X message were received within the threshold time period.

Example 12. The method of any of examples 8-11, in which the first V2X message is a basic safety message.

Example 13. The method of any of examples 8-12, in which the second V2X message is one of a tolling message, a parking access message, a road condition message, a geonetworking message, or an emergency message.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a vehicle-to-everything (V2X) node for communicating V2X information to a network node, comprising:
   transmitting a first V2X message that is associated with a first service and that includes an identifier of a second service; and
   transmitting a second V2X message that is associated with the second service and that includes an identifier of the first service configured to enable the network node to use information from the first V2X message with the second service.

2. The method of claim 1, further comprising
   generating the identifier of the first service from a signing certificate of the first service that is associated with the V2X node; and
   generating the identifier of the second service from a signing certificate of the second service that is associated with the V2X node.

3. The method of claim 2, wherein
   generating the identifier of the first service from a signing certificate of the first service that is associated with the V2X node includes generating a hash of the signing certificate of the first service; and
   generating the identifier of the second service from a signing certificate of the second service that is associated with the V2X node includes generating a hash of the signing certificate of the second service.

4. The method of claim 2, wherein:
   generating the identifier of the first service from a signing certificate of the first service that is associated with the V2X node includes generating a truncated identifier of the signing certificate of the first service; and
   generating the identifier of the second service from a signing certificate of the second service that is associated with the V2X node includes generating a truncated identifier of the signing certificate of the second service.

5. The method of claim 2, further comprising transmitting a third V2X message that is associated with the second service and that includes a truncated identifier of the first service.

6. The method of claim 1, wherein the second V2X message is one of a tolling message, a parking access message, a road condition message, a geonetworking message, a basic safety message or an emergency message.

7. A vehicle-to-everything (V2X) node, comprising:
   a processor configured with processor-executable instructions to:
      transmit to a network node a first V2X message that is associated with a first service and that includes an identifier of a second service; and
      transmit to the network node a second V2X message that is associated with the second service and that includes an identifier of the first service configured to enable the network node to use information from the first V2X message with the second service.

8. The V2X node of claim 7, wherein the processor is further configured with processor-executable instructions to:
   generate the identifier of the first service from a signing certificate of the first service that is associated with the V2X node; and
   generate the identifier of the second service from a signing certificate of the second service that is associated with the V2X node.

9. The V2X node of claim 8, wherein the processor is further configured with processor-executable instructions to:
   generate a hash of the signing certificate of the first service; and
   generate a hash of the signing certificate of the second service.

10. The V2X node of claim 8, wherein the processor is further configured with processor-executable instructions to:
    generate a truncated identifier of the signing certificate of the first service; and
    generate a truncated identifier of the signing certificate of the second service.

11. The V2X node of claim 8, wherein the processor is further configured with processor-executable instructions to transmit a third V2X message that is associated with the second service and that includes a truncated identifier of the first service.

12. The V2X node of claim 7, wherein the processor is further configured with processor-executable instructions such that the second V2X message is one of a tolling message, a parking access message, a road condition message, a geonetworking message, a basic safety message, or an emergency message.

13. A vehicle-to-everything (V2X) node, comprising:
    means for transmitting to a network node a first V2X message that is associated with a first service and that includes an identifier of a second service; and
    means for transmitting to the network node a second V2X message that is associated with the second service and that includes an identifier of the first service configured to enable the network node to use information from the first V2X message with the second service.

14. The V2X node of claim 13, further comprising:
    means for generating the identifier of the first service from a signing certificate of the first service that is associated with the V2X node; and
    means for generating the identifier of the second service from a signing certificate of the second service that is associated with the V2X node.

15. The V2X node of claim 14, wherein
    means for generating the identifier of the first service from a signing certificate of the first service that is associated with the V2X node includes means for generating a hash of the signing certificate of the first service; and means for generating the identifier of the second service from a signing certificate of the second service that is associated with the V2X node includes means for generating a hash of the signing certificate of the second service.

16. The V2X node of claim 14, wherein:
means for generating the identifier of the first service from a signing certificate of the first service that is associated with the V2X node includes means for generating a truncated identifier of the signing certificate of the first service; and
means for generating the identifier of the second service from a signing certificate of the second service that is associated with the V2X node includes means for generating a truncated identifier of the signing certificate of the second service.

17. The V2X node of claim 14, further comprising means for transmitting a third V2X message that is associated with the second service and that includes a truncated identifier of the first service.

18. The V2X node of claim 13, wherein the second V2X message is one of a tolling message, a parking access message, a road condition message, a geonetworking message, a basic safety message, or an emergency message.

19. A method performed by a processor of a network node for receiving vehicle-to-everything (V2X) information from a V2X node, comprising:
receiving from a V2X node a first V2X message that is associated with a first service and that includes an identifier of a second service;
receiving from the V2X node a second V2X message that is associated with the second service and that includes an identifier of the first service; and
using information from the first V2X message with the second service.

20. The method of claim 19, wherein using information from the first V2X message with the second service includes generating an association of the V2X node, the first service, and the second service that enables the network node to use information from the first V2X message with the second service.

21. The method of claim 19, wherein using information from the first V2X message with the second service includes:
obtaining information about the V2X node from the first V2X message; and
performing an operation for the V2X node related to the second service using the obtained information about the V2X node from the first V2X message.

22. The method of claim 19, wherein using information from the first V2X message with the second service includes:
determining whether the first V2X message and the second V2X message were received within a threshold time period; and
using the information from the first V2X message with the second service in response to determining that the first V2X message and the second V2X message were received within the threshold time period.

23. The method of claim 19, wherein the second V2X message is one of a tolling message, a parking access message, a road condition message, a geonetworking message, a basic safety message, or an emergency message.

24. A network node, comprising:
a processor configured with processor-executable instructions to:
receive from a vehicle-to-everything (V2X) node a first V2X message that is associated with a first service and that includes an identifier of a second service;
receive from the V2X node a second V2X message that is associated with the second service and that includes an identifier of the first service; and
use information from the first V2X message with the second service.

25. The network node of claim 24, wherein the processor is further configured with processor-executable instructions to generate an association of the V2X node, the first service, and the second service that enables the network node to use information from the first V2X message with the second service.

26. The network node of claim 24, wherein the processor is further configured with processor-executable instructions to:
obtain information about the V2X node from the first V2X message; and
perform an operation for the V2X node related to the second service using obtained information about the V2X node from the first V2X message.

27. The network node of claim 24, wherein the processor is further configured with processor-executable instructions to:
determine whether the first V2X message and the second V2X message were received within a threshold time period; and
use the information from the first V2X message with the second service in response to determining that the first V2X message and the second V2X message were received within the threshold time period.

28. The network node of claim 24, wherein the processor is further configured with processor-executable instructions such that the second V2X message is one of a tolling message, a parking access message, a road condition message, a geonetworking message, a basic safety message, or an emergency message.

29. A network node, comprising:
means for receiving from a vehicle-to-everything (V2X) node a first V2X message that is associated with a first service and that includes an identifier of a second service;
means for receiving from the V2X node a second V2X message that is associated with the second service and that includes an identifier of the first service; and
means for using information from the first V2X message with the second service.

30. The network node of claim 29, wherein means for using information from the first V2X message with the second service includes means for generating an association of the V2X node, the first service, and the second service that enables the network node to use information from the first V2X message with the second service.

31. The network node of claim 29, wherein means for using information from the first V2X message with the second service includes:
means for obtaining information about the V2X node from the first V2X message; and
means for performing an operation for the V2X node related to the second service using obtained information about the V2X node from the first V2X message.

32. The network node of claim 29, wherein means for using information from the first V2X message with the second service includes:

means for determining whether the first V2X message and the second V2X message were received within a threshold time period; and means for using the information from the first V2X message with the second service in response to determining that the first V2X message and the second V2X message were received within the threshold time period.

33. The network node of claim 29, wherein the second V2X message is one of a tolling message, a parking access message, a road condition message, a geonetworking message, a basic safety message, or an emergency message.

* * * * *